United States Patent
Burks, III

Patent Number: 5,713,263
Date of Patent: Feb. 3, 1998

[54] WINE AERATOR

[76] Inventor: Vance R. Burks, III, 2340 Dunstan, Houston, Tex. 77005

[21] Appl. No.: 490,233

[22] Filed: Jun. 14, 1995

[51] Int. Cl.$^6$ .................................................. A01F 3/04
[52] U.S. Cl. ............................. 99/323.1; 99/277.2
[58] Field of Search ........................ 366/601, 102, 366/103, 104, 106, 107; 99/323.1, 323.2, 323.3, 323.4, 275, 276, 467, 277.1, 277.2

[56] References Cited

U.S. PATENT DOCUMENTS

| | | | |
|---|---|---|---|
| 2,699,718 | 1/1955 | Wright | 99/323.2 |
| 4,205,599 | 6/1980 | Franzosi | 99/323.1 |
| 4,944,601 | 7/1990 | Damon | 99/323.2 |

Primary Examiner—Robert W. Jenkins

[57] ABSTRACT

An improved apparatus for aerating wine. The apparatus includes a housing for containing wine and air, a baffle positioned within the housing interior, and a valve which permits the placement of the wine into the housing interior. The housing can be inverted to mix the wine and air, and the valve prevents the leakage of wine from the housing interior. In one embodiment of the invention, an aperture such as a spout can be attached to the housing to permit the removal of the wine from the housing interior, and the valve is selectively openable to prevent a vacuum as the wine is poured from the apparatus. In another embodiment of the invention, the baffle can be positioned to faciliate the valve closing when the housing is inverted to position the valve on the lower end of the housing.

14 Claims, 2 Drawing Sheets

1
WINE AERATOR

BACKGROUND OF THE INVENTION

The present invention relates to an apparatus for aerating wine. More particularly, the present invention relates to a wine aerating apparatus having a valve to prevent leakage while permitting the wine to be aerated by inverting the apparatus.

Wine is typically stored in sealed bottles which prevent the deterioration of the wine caused by extended contact with ambient air. Various techniques permit the dispensal of a wine sample from a bottle. As shown in U.S. Pat. No. 4,595,121 to Schultz (1986), a valve can be attached to a wine bottle to permit the dispensal of a wine without permitting contact between the ambient air and residual wine in the bottle.

The condition and taste of a bottled wine substantially depends on the chemistry and the storage conditions of the wine. The taste of certain wines improve after the wine has been reoxgenated. For example, a wine is typically allowed to "breath" after opening the bottle to permit contact between the wine and the ambient air. This process reoxgenates the wine and can substantially improve the taste of the wine. The impact of such process depends on the length of time that the wine is exposed to the air, the surface area of the wine in contact with the air, and other factors.

Various techniques have been developed to accelerate the reoxgenation of a wine. U.S. Pat. No. 4,162,129 to Bartholemew, Jr. (1979) disclosed a motor driven oscillator for automatically pouring wine between two containers. U.S. Pat. No. 4,494,452 to Barzso (1985) disclosed a motor driven air pump for pumping air into the wine. U.S. Pat. No. 4,785,724 to Vassallo (1988) similarly disclosed an apparatus for pumping air into the wine. U.S. Pat. No. 5,154,112 to Wettern (1992) disclosed a flexible hand pump for pumping air into the wine, and U.S. Pat. No. 5,293,912 to Wildash et al. (1994) disclosed a horn shaped container for contacting the wine with the ambient air.

Mechanical pumps such as those described above contain moving parts that require additional cost and maintenance of the devices. Other known devices do not efficiently oxygenate the wine. Consequently, a need exists for an improved apparatus that can expedite the oxygenation of wine.

SUMMARY OF THE INVENTION

The invention provides an improved apparatus for aerating a portion of wine. A housing has an interior for containing air and the wine. The housing can be inverted to move the wine from one end to the other, and a baffle within the housing agitates the wine to mix the wine and the air. A valve is attached to the housing for selectively permitting the wine to be placed into and removed from the interior of the housing, and for preventing the leakage of the wine from the housing interior when the housing is inverted.

In other embodiments of the invention, an aperture can be attached to the housing, at an end opposite that of the valve, to facilitate the withdrawal of the wine from the housing interior. A spout can be attached to the aperture to facilitate the pouring of the wine. The valve can be selectively opened when the wine is withdrawn through the aperture to prevent a vacuum from developing within the housing interior. In another embodiment of the invention, the baffle can contact the valve when the housing is oriented with the valve at the lower end to facilitate the closing of the valve as the housing is inverted.

DESCRIPTION OF THE PREFERRED EMBODIMENTS

Figure 1:
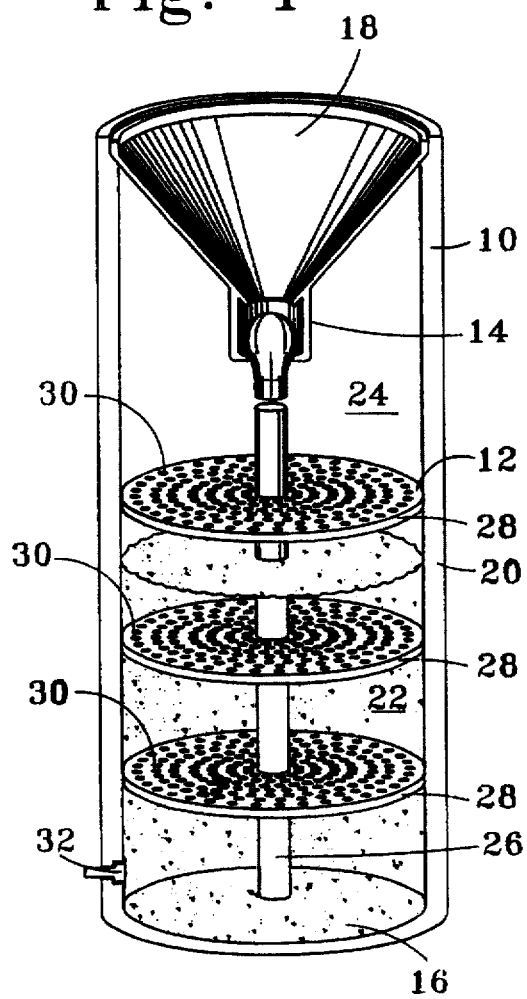
FIG. 1 illustrates an elevation view of the invention.

The present invention describes an improved apparatus for aerating fluids such as wine. As shown in FIG. 1, the apparatus is generally described as container or housing 10, baffle 12, and valve 14. Housing 10 is shown as an elongated cylinder having lower closed end 16, open end 18, and wall 20 that cumulatively define an interior space. Valve 14 sealingly engages open end 18 and prevents wine 22 from exiting the interior of housing 10. Baffle 12 generally comprises central stem 26 and radially extending plates 28. Numerous perforations or apertures, illustrated at 30, pierce through plates 28 for the purpose described below.

Valve 14 is initially opened to permit the placement of wine 22 into the interior of housing 10. As shown in FIG. 1, wine 22 does not completely fill housing 10. Consequently, a quantity of air 24 resides within the interior of housing 10. Although the ratio of air 24 to wine 22 within housing 10 is not critical to the use of the invention, it will be appreciated that a higher air to wine ratio will limit the number of times required for the operation of the apparatus to accomplish the desired degree of oxygenation.

After wine 22 has been placed within the interior of housing 10, valve 14 is closed to prevent the leakage of wine 22, and housing 10 can be inverted to mix wine 22 with air 24. As housing 10 is inverted, valve 14 is positioned on the lower end of housing 10. Wine 22 falls downwardly toward valve 14 as the less dense air 24 rises upwardly toward the new top of housing 10. As wine 22 falls, wine 22 is agitated through contact with baffle 12 and with the interior of wall 20. Wine 22 is agitated as it falls through the annulus between wall 20 and the outer edges of plates 28. Wine 22 also falls through perforations 30 through plates 28. Accordingly, such movement agitates wine 22 and creates a dynamic mixing between wine 22 and air 24 that substantially increases surface contact therebetween. This contact oxygenates wine 22 as air 24 is absorbed into wine 22.

The benefit of this mixing accelerates the oxgenation of wine 22 with minimal effort and does not depend on electric power sources for operation. It is believed that each passage of wine 22 through baffle 12 is substantially equivalent to five minutes of exposure between an unmixed wine sample and the ambient air.

Housing 10 can be reinverted so that valve 12 is repositioned on the upper end of housing 10. If desired, this cycle can be repeated until the desired oxygenation of wine 22 is obtained.

In one embodiment of the invention as shown in FIG. 1, valve 14 automitically opens, when housing 10 is oriented with valve 14 at the top, so that the interior of housing 10 is open to contact with the ambient air outside of housing 10. In this embodiment of the invention, valve 14 is closed when housing 10 is inverted to prevent leakage of wine 22 from the interior of housing 10.

In another embodiment of the invention, exit valve 32 can be attached to housing 10 at a location opposite valve 14. Exit valve 32 can be opened to permit the withdrawal of wine 22 from housing 10. Valve 14 can be opened to faciliate the removal of wine 22 by preventing a vacuum or suction force within housing 10 which would resist the flow of wine 22. Alternatively, wine 22 could be removed from housing 10 through valve 14, and the opening of exit valve 32 could prevent a vacuum force from being created within housing 10.

Figure 2:
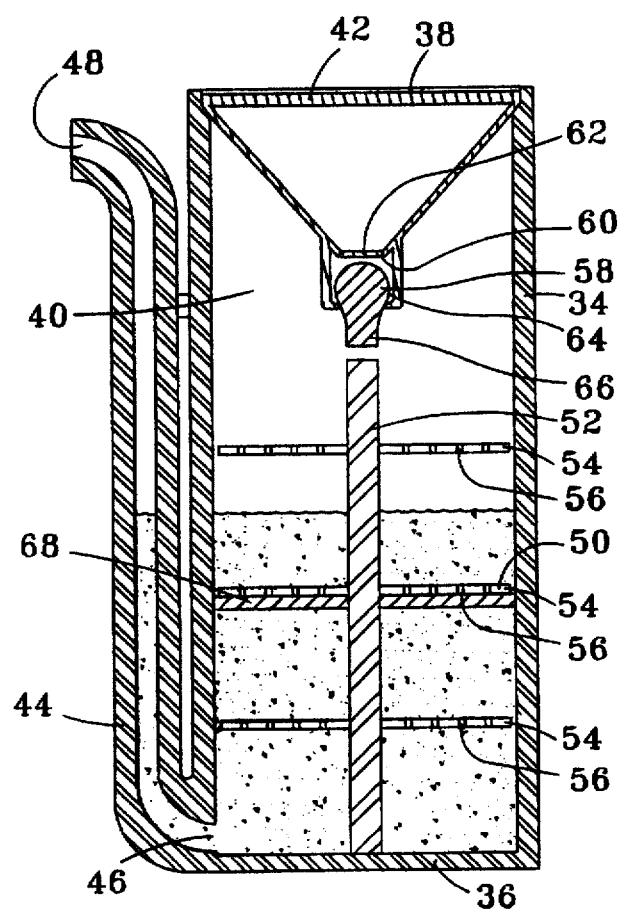
FIG. 2 illustrates an elevation view of a housing having an aperture and attached spout.

FIG. 2 illustrates another embodiment of the invention. Housing 34 is similar to housing 10 shown in FIG. 1, and includes lower closed end 36 and open end 38. Valve 40 is attached to end cap 42, which in turn cooperates to close open end 38. Spout 44 is attached to housing 34 and includes aperture 46 through housing 34 and open mouth 48. Baffle 50 is positioned within the interior of housing 34, and generally includes central stem 52 and radial plates 54 having perforations 56.

In this embodiment of the invention, valve 40 generally comprises valve element 58 and valve seat 60 defining aperture 62. Valve element 58 is illustrated as a substantially circular ball having curved surface 64. Valve seat 60 has a curved surface with a radius substantially equal to the radius of curved surface 64. When valve element 58 contacts valve seat 60, valve element 58 closes aperture 62 and prevents fluid flow therethrough. As shown in FIG. 2, weight 66 can be attached to valve element 58 to guide the movement of valve element 58 and to provide additional mass to valve element 58. Such additional mass increases the sealing force exerted by valve element 58 against valve seat 60 and also shortens the response time required to close valve element 58 against valve seat 60.

Filter 68 can be attached to baffle 50 to remove sediments from wine 22. Filter 68 is preferable removable from such attachment, or is formed with a material that can be cleaned after removal from the interior of housing 34. Filter 68 can be attached to baffle 50 and can be attached to baffle 12 shown in FIG. 1.

Figure 3:
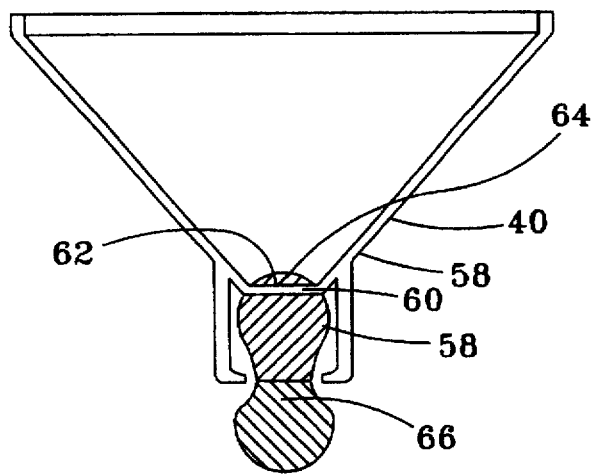
FIG. 3 illustrates one embodiment of a valve mechanism.
Figure 4:
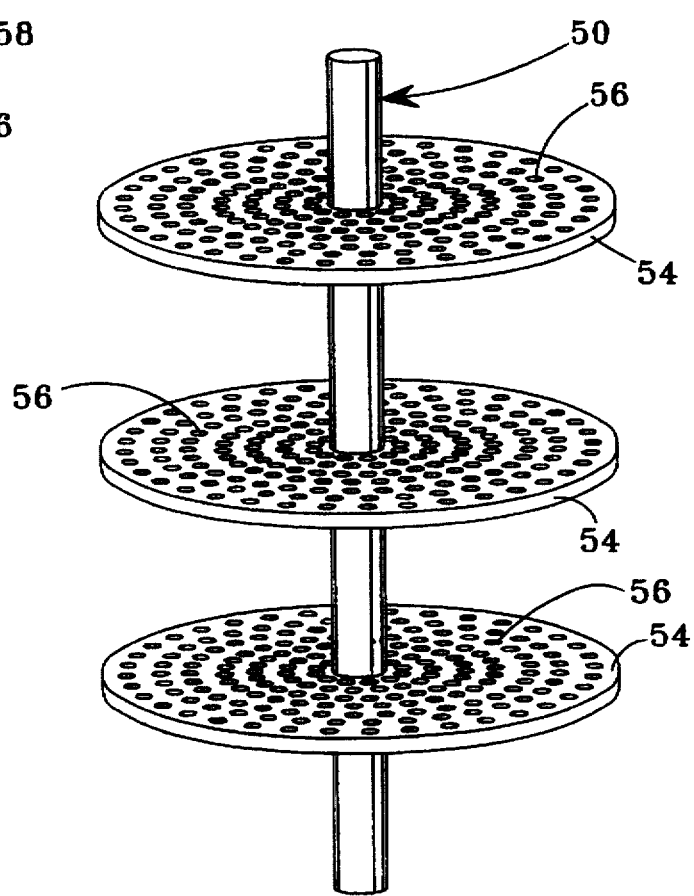
FIG. 4 illustrates an elevation view of a baffle.

FIG. 3 illustrates detail of valve 40 shown in FIG. 2, and FIG. 4 illustrates detail of baffle 50. As shown by FIGS. 3 and 4, valve 40 and baffle can be removed from the interior of housing 34 in a preferred embodiment to facilitate the cleaning of valve 40 and baffle 50.

Although valve 40 is illustrated as a ball and seat valve, different valves and valve combinations can be used without departing from the scope of the invention. The embodiments of valve illustrated in FIGS. 1–4 can be made from the same material as the other components of the invention and do not require springs or other mechanical devices. As representative examples, the invention components can be made from plastic, glass, pyrex, metals, or other materials. The embodiments shown herein are preferred because of the lower cost and maintenance provided, yet other designs and configurations can be made to accomplish the function of the invention.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for aerating wine, comprising:

a housing having an interior for containing air and the wine, wherein said housing is invertable to move the wine from one end of said housing to an opposite end of said housing;

a baffle within said housing for agitating the wine, when said housing is inverted, to contact the air and the wine within said housing; and a valve attached to said housing and having a port for selectively permitting the wine and the air to be moved through said valve wherein said valve is operable to automatically open said port to permit the entrance of air into the housing interior when said port is positioned at the upper end of said housing, and wherein said valve is operable to automatically close said port to prevent the leakage of the wine from the housing interior when said housing is inverted.

2. An apparatus as recited in claim 1, further comprising an aperture attached to said housing at a position opposite said valve for permitting the selective removal of the wine from the housing interior.

3. An apparatus as recited in claim 2, further comprising a spout attached to said aperture.

4. An apparatus as recited in claim 1, wherein said baffle contacts said valve when said valve is positioned on the lower end of said housing to facilitate the closing of said valve.

5. An apparatus as recited in claim 4, wherein said baffle is formed with a central stem connected to radially extending plates, and wherein said central stem contacts said valve when said valve is positioned on the lower end of said housing.

6. An apparatus as recited in claim 5, wherein said radially extending plates have a plurality of apertures to permit the passage of the wine therethrough when said housing is inverted.

7. An apparatus as recited in claim 1, wherein said baffle is removable from the housing interior.

8. An apparatus for aerating wine, comprising:

a housing having an interior for containing air and the wine, wherein said housing is invertable to move the wine from one end of said housing to an opposite end of said housing;

a baffle within said housing for agitating the wine, when said housing is inverted, to contact the air and the wine within said housing;

a valve attached to said housing for selectively permitting the wine to be placed into and removed from the housing interior, and for preventing the leakage of the wine from the housing interior when said housing is inverted; and a filter attached to said baffle.

9. An apparatus for aerating wine, comprising:

a housing having an interior for containing air and the wine, wherein said housing is invertable to move the wine from one end of said housing to an opposite end of said housing;

a baffle within said housing for agitating the wine, when said housing is inverted, to contact the air and the wine within said housing;

a spout having an aperture engaged with one end of said housing and having a mouth for selectively discharging the wine; and a valve attached to an end of said housing substantially opposite the aperture of said spout for selectively permitting the wine to be placed into and removed from the housing interior, wherein said valve comprises a sealing element having a curved surface for contacting a curved valve seat and for selectively preventing flow of the wine through an aperture defined by the valve seat.

10. An apparatus as recited in claim 9, wherein said valve element is withdrawn from contact with the valve seat when the wine is removed through said spout.

11. An apparatus as recited in claim 9 wherein said baffle contacts the sealing element of said valve, when said housing is inverted to position said valve on the lower end of said housing, to urge said sealing element into contact with said valve seat.

12. An apparatus as recited in claim 9, further comprising a filter attached to said baffle.

13. An apparatus as recited in claim 9, further comprising a removable housing end attached to said valve which can be removed from said housing to permit the removal of said baffle from the housing interior.

14. An apparatus as recited in claim 9, wherein said housing is substantially transparent.

* * * * *